United States Patent [19]

Collins

[11] 3,964,015
[45] June 15, 1976

[54] AIRCRAFT APPROACH AND LANDING LIGHT SYSTEM

[76] Inventor: William O. Collins, 6258 N. Kensington St., McLean, Va. 22101

[22] Filed: Feb. 21, 1974

[21] Appl. No.: 444,353

[52] U.S. Cl. .............................. 340/26; 240/1.2; 244/114 R
[51] Int. Cl.² ...................................... G08G 5/00
[58] Field of Search .................. 240/1.2; 244/114 R; 340/25, 26, 27 R, 27 NA, 28

[56] References Cited
UNITED STATES PATENTS

| | | | |
|---|---|---|---|
| 2,669,703 | 2/1954 | Hammond et al. | 340/26 |
| 2,691,150 | 10/1954 | Davis | 340/26 |
| 3,152,316 | 10/1964 | Baxter et al. | 340/26 |
| 3,813,657 | 5/1974 | Henry | 340/26 |

*Primary Examiner*—John W. Caldwell
*Assistant Examiner*—James J. Groody
*Attorney, Agent, or Firm*—Clarence A. O'Brien; Harvey B. Jacobson

[57] ABSTRACT

A light system providing a visual indicator arrangement that is visible to an aircraft pilot to provide guidance during a runway approach segment and landing segment of the flight path of an aircraft. The system includes lighted indicators which define two inclined plane surfaces, the intersection of which forms a straight line which is precisely the correct path for the aircraft to follow in making its approach to the runway with the indicators being so arranged as to form lines which appear to the pilot to converge and intersect at an aiming point on the runway even though the point on the runway is not yet visible. Additionally, the system includes a landing segment for providing guidance for flare-out and actual touch down which includes lighted indicators at predetermined intervals alongside at least one side of the runway with the indicators defining a number of plane surfaces each of which intersect a longitudinal vertical plane passing through the runway center line so as to form or define a precise landing path for the eyes of the pilot.

2 Claims, 8 Drawing Figures

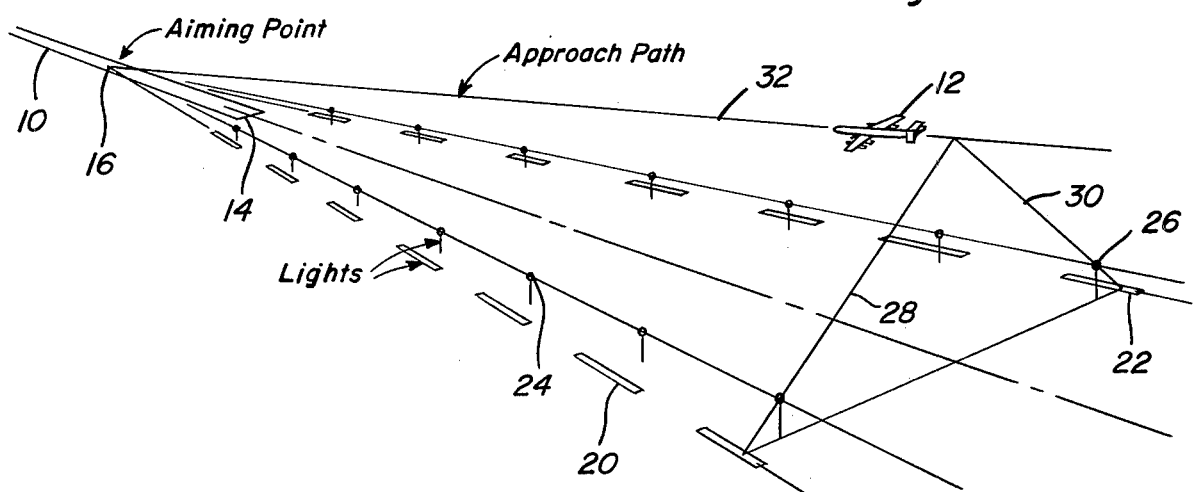
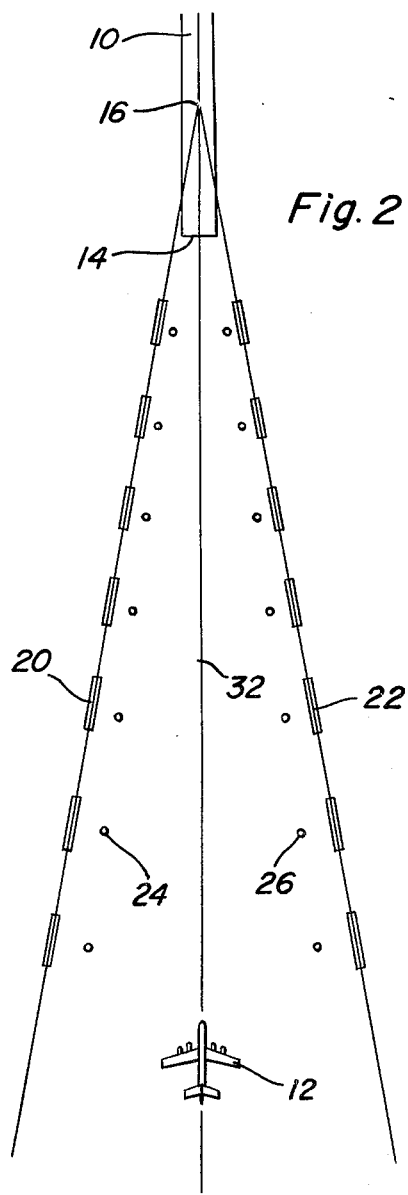
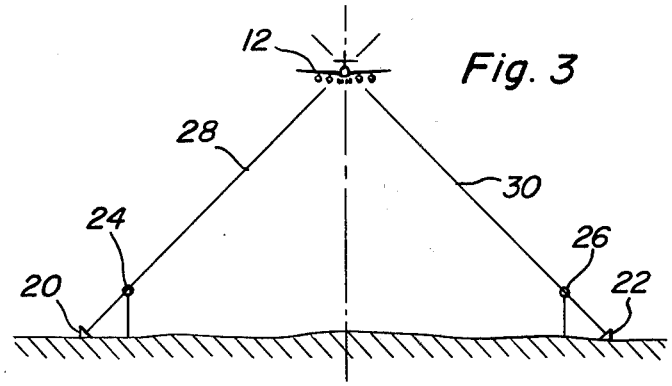
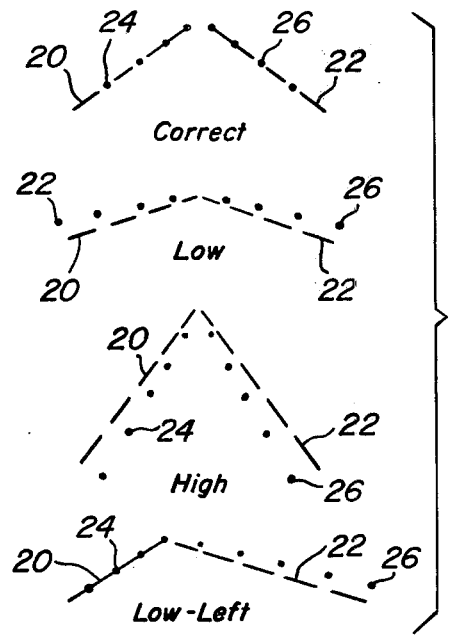

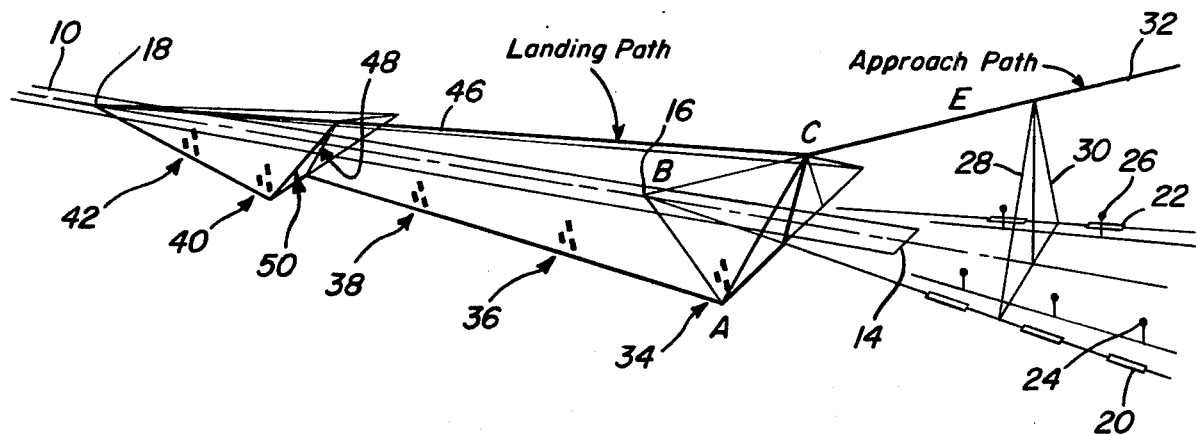
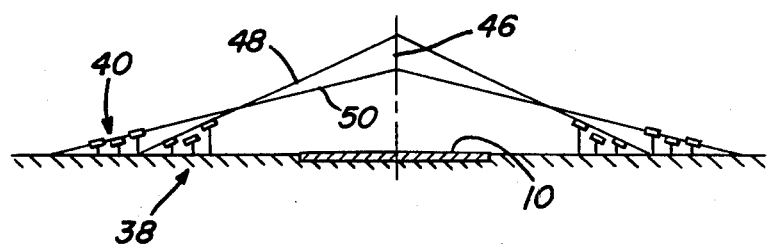
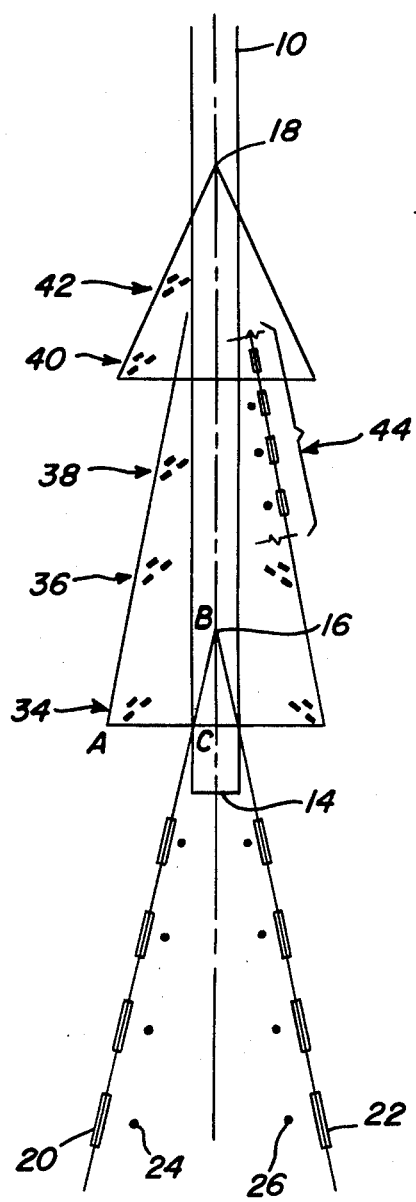
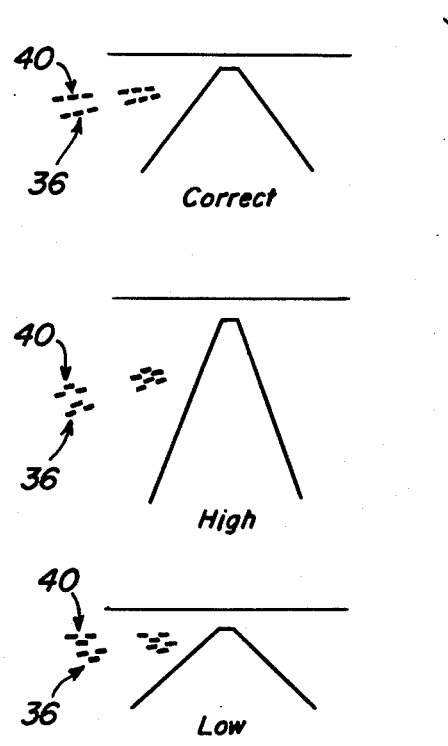

AIRCRAFT APPROACH AND LANDING LIGHT SYSTEM

BACKGROUND OF THE INVENTION

1. Field of the Invention

This invention relates to a light system for guidance of aircraft and more particularly a visual light system by which the approach of an aircraft to a runway is guided and the flare-out and touch down of the aircraft to the runway is precisely guided.

2. Description of the Prior Art

Aircraft guidance lighting systems are presently being used in many airports and operate to a degree of satisfaction to provide a pilot with guidance during the approach segment of a landing when visibility conditions are good. However, in low visibility conditions, deficiencies occur in the present approach lighting systems in that they will provide a pilot with horizontal and roll guidance but do not provide him with vertical guidance. Also, in low visibility conditions and possibly in good visibility conditions, while the present approach lighting system will guide the pilot during the approach segment of his landing path to the runway threshold, present systems fail to provide adequate guidance during the landing segment to guide the pilot during flare-out and touch down.

SUMMARY OF THE INVENTION

An object of the present invention is to provide an aircraft guidance system for providing guidance visible to a pilot during both the approach segment and landing segment of the aircraft when approaching and landing on a runway.

In the approach segment of the landing path, the indicating lights provide vertical and pitch guidance as well as horizontal and roll guidance for virtually eliminating missed approaches and danger of undershooting the runway due to a pilot's inability to visually determine his vertical position. This is attained by a system of lighted indicators oriented on or near the ground which define two plane surfaces, the intersection of which is a straight line which is precisely the correct path for the aircraft to follow in making its approach to the runway. The indicators are arranged in a manner to form lines which appear to the pilot to converge at the correct point of the runway even though that point on the runway and the runway itself is not yet visible. In the flare and landing segment of the landing path, the pilot receives guidance from the runway threshold to which he has been properly guided by the approach segment. At this point, the landing path changes from a slope of about 3° to a flare-out and very flat descent of about 1° until the wheels of the aircraft touch down on the runway. This guidance during the flare-out and touch down segment is provided by indicator units oriented at predetermined spaced intervals along at least one side or both sides of the runway positioned and configured to define a number of plane surfaces each of which intersect a longitudinal vertical plane passing through the runway center line so as to form or define the precise landing path of the pilot's eyes so that the indicators would all show as being aligned when the aircraft is on correct landing path but their slopes would vary by becoming flatter as they are placed further down the runway with the intersections of all of the imaginary plane surfaces with the ground being lines which converge at a point on the runway where the landing path line touches the runway.

It is another object of the invention to provide a visual light system for providing guidance to aircraft pilots during both an approach segment and a landing segment of a landing path for the aircraft to enable accurate and precise visual guidance for the aircraft pilot in which the system is relatively inexpensive and materially enhances the capability of a pilot to safely land an aircraft even in periods of very low visibility.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the approach segment of the light system of the present invention illustrating the line of intersection of two plane surfaces formed by the lighting system.

FIG. 2 is a top plan view of the assembly of FIG. 1.

FIG. 3 is a vertical elevational view of the assembly of FIGS. 1 and 2 illustrating the intersecting relationship of the two plane surfaces.

FIG. 4 is a diagrammatic view illustrating the light system of the present invention indicating a correct path and incorrect path.

FIG. 5 is a perspective view of the landing segment of the flight path.

FIG. 6 is a top plan view of the assembly of FIG. 5.

FIG. 7 is an end elevational view of the assembly of FIG. 5 illustrating the plane intersections.

FIG. 8 is a diagrammatic view showing a correct flight path and incorrect flight path.

DESCRIPTION OF THE PREFERRED EMBODIMENT

Referring now to the drawings, an airport runway is designated by reference numeral 10 with the landing aircraft being designated by numeral 12. The light system of this invention is divided into two segments with the approach segment being illustrated in FIGS. 1–4 and the landing segment being illustrated in FIGS. 5–8 with the pilot using the approach segment for guidance to the threshold 14 and an aiming point 16 spaced from the threshold 14 of the runway 10 and the pilot using the landing segment for the flare-out and flat rate of descent to a touch down point 18 on the runway 10.

The approach segment includes two rows of light bars 20 and 22 which converge and intersect at the aiming point 16 as illustrated in FIG. 2. Located inwardly of and above the rows of light bars 20 and 22 is a pair of rows of lights 24 and 26 which may be in the form of round light dots which also converge to the aiming point 16 and which are located inwardly of and above the horizontal plane of the light bars 20 and 22 as illustrated in FIGS. 1 and 3. The two plane surfaces 28 and 30 illustrated in FIG. 3 are defined by a surface passing through the lights 24 and 20 on one side and the lights 26 and 22 on the other side so that the point of intersection of the plane surfaces 28 and 30 form a precise approach path 32 for the aircraft 12 as illustrated in FIGS. 1 and 2 so that the aircraft will in the appropriate approach path in alignment with the center of the runway and in the appropriate slope toward the aiming point 16 of the runway 10.

The pilot's eye will see an arrangement illustrated in the upper diagrammatic illustration in FIG. 4 when he is on the proper approach path 32. The other three illustrations in FIG. 4 will indicate to the pilot that he is not on the correct approach path and will indicate to him what must be done to correct his approach path so that the aircraft 12 will precisely follow the approach path 32 defined by the intersection of the two plane surfaces 28 and 30.

With the approach lights defining the approach path 32, the pilot will be provided with a target towards which the aircraft is to be aimed for landing at the correct point on the runway and provides the pilot with precise horizontal and vertical guidance for putting and keeping the aircraft on a correct approach path even when only a segment of the approach lights are visible due to rain, fog or other conditions causing low visibility. The intersection of the two plane surfaces is a straight line 32 which is the precise correct path for the aircraft to follow in making its approach to the runway with the indicators forming lines which to the pilot converge at the correct point of the runway even though that point or the runway itself is not yet visible. When the pilot's line of sight is on either plane surface, the lights defining that surface will form a straight line or segments lying in a straight line since the indicator lights are also situated as to be in that plane. The rows of lights should be distinctly different from each other so that when the pilot's eye is above the plane, he would see two distinct rows of lights and if the pilot's eyes are too low, the rows would be reversed. The closer the aircraft and pilot's eye is to being in the plane surface, the closer the rows will become and will merge into a single row when right on the plane surface. The light rows could be distinctly colored and provided with a slot arrangement so that the pilot could only see the light when on the plane surface and if above the plane surface, the light would disappear or the light could be made to change color when above the surface such as appearing yellow and if below the plane, the light could also disappear or change color and because of the danger element should be made to change to red. Other arrangements could be provided in order to provide guidance to the pilot. The warning feature whereby all or some of the lights change to red for low approach positions is desirable regardless of how the plane surface is indicated to the pilot. While this portion of the invention relates primarily to the approach to the runway in its final stages, approximately 3,000 to 4,000 feet from the threshold, it may also provide enroute guidance or check points. For example, rows of lights on or near the ground, or water surface, can define the plane surfaces and hence the correct path of the aircraft going through mountain passes or the like where the airport is not visible until the pass has been traversed but is near enough that correct altitude for a good approach to the runway is important. Also, the correct approach slope can be defined by a plurality of intersecting and defined plane surfaces wherever this might be to advantage. For example, where there is a deep drop off in the runway approach and the land contours favor two or more pairs of defined planes, all having a common line of intersection.

The landing segment of the flight path illustrated in FIGS. 5–8 provides a continuation of the approach segment of the flight path with the aircraft following the approach line 32 to the runway threshold. At this point, the pilot looks to the landing segment for flare-out and guidance to actual touch down.

The guide slope or approach path to the threshold and perhaps slightly down the runway toward the landing point 16 is about 3° above horizontal. Then the path changes to a flare-out and very flat descent about 1° above horizontal until the wheels of the aircraft touch down on the runway pavement. The landing segment of the system defines the flare-out and the resulting flat descent.

The landing segment includes indicating light units 34, 36, 38, 40 and 42 with each light unit being in the form of three bar lights or any other lights of suitable configuration with the lights being oriented on one or both sides of the runway 10. If light units are mounted on both sides of the runway, they must match each other with the bracketed portion of the lights generally designated by numeral 44 in the right-hand portion of FIG. 6 indicating another type of light assembly in the form of longitudinally extending bars with dot type lights associated therewith. As indicated, the indicating units 34–42 are disposed at predetermined spaced intervals and are so positioned and configured to define a number of plane surfaces each of which intersect a longitudinal vertical plane passing through the runway center line so as to form or define the precise landing path 46 of the pilot's eyes. Probably three of these planes would suffice if a varying distance of the indicators from the runway is acceptable as illustrated but in some instances, it may be preferable to keep all of the indicator units the same distance from the runway edge with it being essential that the indicators be spaced longitudinally close enough that even in fog, two or more could be seen at once thus requiring a corresponding number of plane surfaces. The indicator units would all show as being aligned when the aircraft is on a correct landing path as illustrated in FIG. 8 but their slopes would vary, becoming flatter as they are placed further down the runway as illustrated in FIG. 7. It is pointed out that the intersection of all of the imaginary plane surfaces with the ground are lines which all coverage at a point on the runway where the landing path line 46 touches the runway 10 which is indicated at the touch down point 18.

As illustrated, the indicating units 34 are placed in plane ABC thus defining line BCE which corresponds with the approach path 32. As the pilot's eye picks up the indicating units 34, 36, 38, 40 and 42, the unit 34 is indicating the approach path and when the pilot's eye no longer observes the indicating unit 34, the indicating units 36, 38, 40 and 42 will guide the pilot on the landing path 46. During the landing segment, the runway edge lights or runway center line lights have become visible or at least a part of them have become visible so that the pilot has horizontal guidance from them and thus will be over the center line of the runway and will automatically be at correct height and rate of descent for landing and touch down if he keeps the indicator lights aligned. If the indicator lights are used on both sides of the runway, the plane surfaces they define as designated by numerals 48 and 50 in FIG. 7 provide the intersection which is the landing path 46 but because these imaginary planes become progressively flatter, the intersection becomes subject to increasing horizontal error and therefore reliance should be placed on the conventional runway lights or center line lights for horizontal control. Because horizontal guidance is available over the runway, the guidance as to the height need only be given periodically since no aiming effect need be derived from the indicator lights as a group. Therefore, the indicator lights can be in the form of clusters of lights, three bars to be aligned as illustrated, two dots and a bar, two bars and a dot, a triangular configuration showing as a line when on course and triangular otherwise or any other suitable configuration. Also color differences of lights may be used for this purpose. In the landing segment, it probably is not necessary to incorporate a red danger feature for being too low since the runway is just below and a relatively flat path of descent has already been achieved. Also, it is preferable to color differentiate the approach light units from the landing segment units with the lighting intensity for the landing segment lights also being less with fog penetration being determined more by reduced spacing than by light intensity.

When the indicator light units in the landing segment form a line parallel to the runway with a fixed offset distance, the plurality of triangular plane surfaces such as 48 and 50 at each light unit would have the indicators in the corners of the plane triangles with each group of indicators being equally spaced from the runway but the height of the triangular plane surface at each group of indicators being progressively less so that the height of each vertical triangular surface will terminate at its upper end on the landing path 46.

Thus, with the approach segment and landing segment of the flight path being indicated by the indicating light units, the pilot is provided with a continuous and precise guidance along the approach path with the indicating units not only indicating to the pilot whether he is on course or off course but also indicating to him the direction which he is off course and the degree that he is off course in order to enable proper correction of the deviation so that the aircraft 12 will proceed on the approach path 32. When he approaches the landing path segment 46 of a flight path, the pilot's eyes will pick up the indicating units in the landing path segment so that he will flatten his rate of descent and properly flare-out his landing path to the touch down point 18 by following the guidance provided by the light indicating units in the landing segment.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. A visual approach guidance system for guiding an aircraft toward an aiming point on a runway comprising a plurality of indicating light units spaced equally on each side of the correct approach path for the aircraft with the light units converging toward the aiming point, each of the light units including at least two light members oriented in laterally and vertically spaced relation with the inner light members being above the outer light members, the outer light members being in the form of a longitudinal light bar and the inner light members being a dot-type light for direct viewing of the bars from the approach path as closely spaced solid line segments in longitudinal alignment and converging toward the aiming point and direct viewing of the dot-type lights from the approach path as being in alignment with the bars, a vertical plane including the dot-type lights in a pair of light units disposed in transversely aligned relation on opposite sides of the correct approach path for the aircraft and being defined by a base line extending between the outer light members and sides extending from the outer light members through the dot-type light members having its apex coinciding with the approach path of an aircraft whereby the pilot of an aircraft following the approach path will observe two converging segmental lines of light with the dot-type lights being aligned with the light bars, an inclined triangular plane surface being defined by the approach path extending to the aiming point, the outer light members along one side of the approach path extending to the aiming point and a base line extending from an outer light member along said one side of the approach path and through a corresponding inner light member to the approach path with the aiming point defining the apex of the inclined triangular surface, and a guidance system for guiding an aircraft during the flare out and touchdown portion of the approach path in which the touchdown point is longitudinally inwardly on the runway from the aiming point, said guidance system for the flare out portion including a plurality of indicating light units spaced along the runway and converging toward the touchdown point, each indicating light unit in the guidance system for the flare out portion of the approach path including three elongated bars with two of said bars in longitudinal alignment with each other and the third bar disposed in spaced parallel relation thereto and centrally between said two of the bars for direct viewing of the bars themselves as closely spaced solid line segments in apparent longitudinal alignment with each other while following the flare out portion of the approach path toward the touchdown point.

2. The structure as defined in claim 1 wherein said indicating light units of the guidance system for the flare out portion of the approach path are disposed in an inclined plane surface having one side defined by the flare out portion of the approach path, one side defined by the indicating light units with the touchdown point defining the apex and the base line being defined by a line disposed in a vertical plane including the outermost indicating light unit of the guidance system for the flare out portion of the approach path and the approach path at a point remote from the touchdown point, and the touchdown portion of the guidance system including a plurality of indicator light units disposed along side the runway and converging toward the touchdown point with each of the indicator light units including three elongated bars with two of said bars in longitudinal alignment with each other and the third of said bars in parallel spaced relation to the two longitudinally aligned bars and centrally between said two of the bars, said bars directly viewed as closely spaced solid line segments in apparent longitudinal alignment with each other from an aircraft following the touchdown portion of the approach path toward the touchdown point, the indicator light units defining the touchdown portion of the guidance system being disposed in an inclined plane having one side thereof defined by the touchdown portion of the approach path, the other side being defined by the indicator light units with the touchdown point defining the apex and the base line defined by a line in a vertical plane which extends between the outermost indicator light unit and the touchdown portion of the approach path.

* * * * *